United States Patent [19]

Jincks et al.

[11] Patent Number: 4,931,768

[45] Date of Patent: Jun. 5, 1990

[54] MULTICOLOR EMERGENCY VEHICLE LIGHT

[75] Inventors: Danny C. Jincks, Annapolis; Michael D. Latta, St. Louis, both of Mo.

[73] Assignee: Public Safety Equipment, Inc., St. Louis, Mo.

[21] Appl. No.: 227,065

[22] Filed: Aug. 1, 1988

[51] Int. Cl.$^5$ .................... B60Q 7/00; B61L 29/24
[52] U.S. Cl. .................... 340/473; 340/471; 340/472; 246/473.3; 362/83.1; 362/35; 362/170; 350/97
[58] Field of Search ............ 340/84, 81 P, 87, 50, 340/90, 472, 473, 471; 362/35, 170, 373, 800, 80, 83.1, 83.2, 83.3, 235, 294; 350/97, 99, 100, 101, 102, 103, 253, 248; 246/473.3

[56] References Cited

U.S. PATENT DOCUMENTS

| | | | |
|---|---|---|---|
| D. 189,429 | 12/1960 | Kennelly et al. | D48/20 |
| D. 202,842 | 11/1965 | Kennelly | D72/1 |
| D. 221,299 | 7/1971 | Burland | D12/99 |
| D. 228,571 | 10/1973 | Burland | D26/02 |
| D. 286,988 | 12/1986 | Akiyama et al. | D10/114 |
| D. 286,989 | 12/1986 | Akiyama et al. | D10/114 |
| 1,854,302 | 4/1932 | Hansen . | |
| 2,719,282 | 9/1955 | Roth | 340/50 |
| 2,762,994 | 9/1956 | Kennelly | 340/50 |
| 2,810,065 | 10/1957 | Peck | 362/35 |
| 2,846,663 | 8/1958 | Heehler et al. | 340/50 |
| 3,066,219 | 11/1962 | Duddy | 240/47 |
| 3,108,751 | 10/1963 | Rodmaker et al. | 240/51.11 |
| 3,179,791 | 4/1965 | Mole | 362/35 |
| 3,292,287 | 12/1966 | Marn | 362/35 |
| 3,309,661 | 3/1967 | Kennelly | 340/50 |
| 3,404,371 | 10/1963 | Gosswiller | 340/87 |
| 3,408,624 | 10/1968 | Kennelly | 340/50 |
| 3,543,234 | 11/1970 | Kennelly | 340/102 |
| 3,546,669 | 12/1970 | Kennelly | 340/84 |
| 3,723,725 | 3/1973 | Jaeger | 240/46.59 |
| 3,739,336 | 6/1973 | Burland | 340/50 |
| 4,020,047 | 4/1977 | Burland | 240/46.59 |
| 4,118,766 | 10/1978 | Kredo | 362/427 |
| 4,142,179 | 2/1979 | Lowndes | 362/373 |
| 4,244,599 | 9/1980 | Peirish, Jr. et al. | 340/84 |
| 4,375,634 | 3/1983 | Leis | 340/81 R |
| 4,506,317 | 3/1985 | Duddy | 362/396 |
| 4,543,622 | 9/1985 | Menke et al. | 362/219 |
| 4,577,178 | 3/1986 | Hitora | 340/81 R |
| 4,626,966 | 12/1986 | Bleiwas et al. | 362/35 |
| 4,754,272 | 6/1988 | Illenberg et al. | 340/50 |
| 4,780,799 | 10/1988 | Groh | 362/294 |

OTHER PUBLICATIONS

Smith & Wesson Catalog, Models L-11H and 610, p. 7. 3-1989.
SHO-ME Catalog, Models 01-169 and 01-166, 2 pp. 3-1989.
1987 Whelen Engineering Co., Catalog. all Models, pp. 4 and 5, 10 thru 12, 3-1989.
Dietz Catalog, all Models, Page 4, 3-1989.
Engineered Security Products Catalog, Models CH-21 and CH-19.
Warning Lights Catalog, Sireno and Mity Lite Models. 3-1989.
Signal-Stat Catalog, all Models, page 7 and 9. 3-1989.
Mars Catalog, Skybolt and Skybar Models. 3-1989.
Federal Signal Catalog, all Fire Ball Models, pages 24, 25, Tripp Lite Catalog, all Models, page 3, 3-1989.
Southern VP Catalog, Models 1166, 1168, 2266, 1170, 200-C, PM 25, 1175, BAG, 872, and 875, 5 pages, 3-1989.

Primary Examiner—Donnie L. Crosland
Attorney, Agent, or Firm—Senniger, Powers, Leavitt and Roedel

[57] ABSTRACT

A base adapted to be mounted on a vehicle supports a light source for generating a rotating light beam. A dome-shaped lens is positioned on the base over the light source to form an enclosure for the light source. A coating may be located on the top of the lens to prevent light passing therethrough and into the passenger compartment. Multiple flashes are created by a reflector positioned adjacent the rear portion of the lens to reflect the rotating beam as a plurality of discrete flashes within a sector relative to the base. A filter generally having a contour of the front portion of the lens may be mounted thereon. The multiple flashes may be of different colors depending on the range of wavelength of light transmitted by the lens and filter and reflected by the reflector. A person viewing the light sees at least four discrete flashes of light which may be of varying colors.

52 Claims, 7 Drawing Sheets

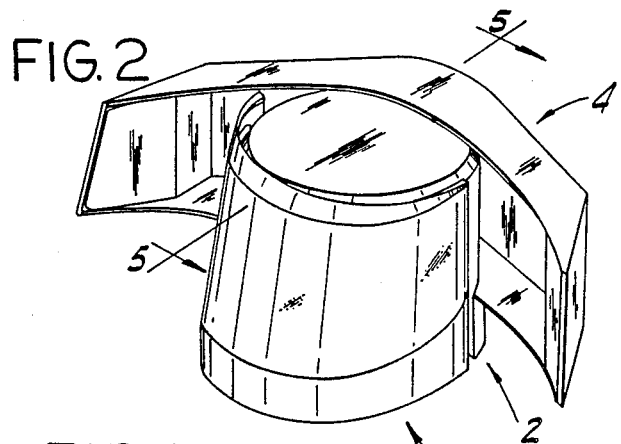
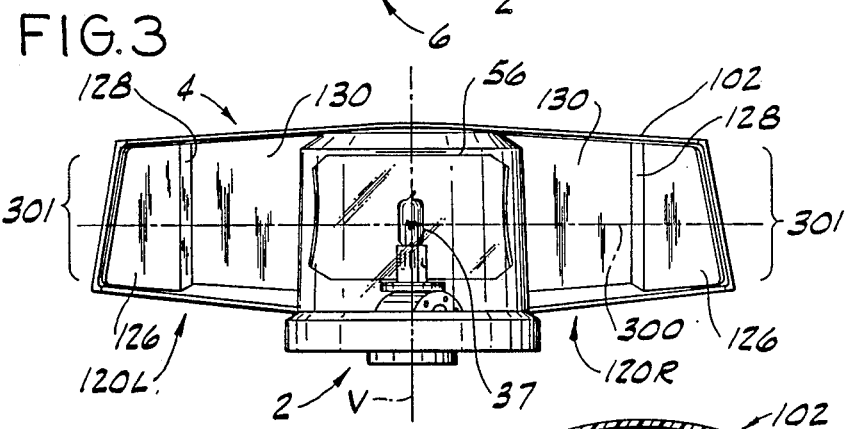
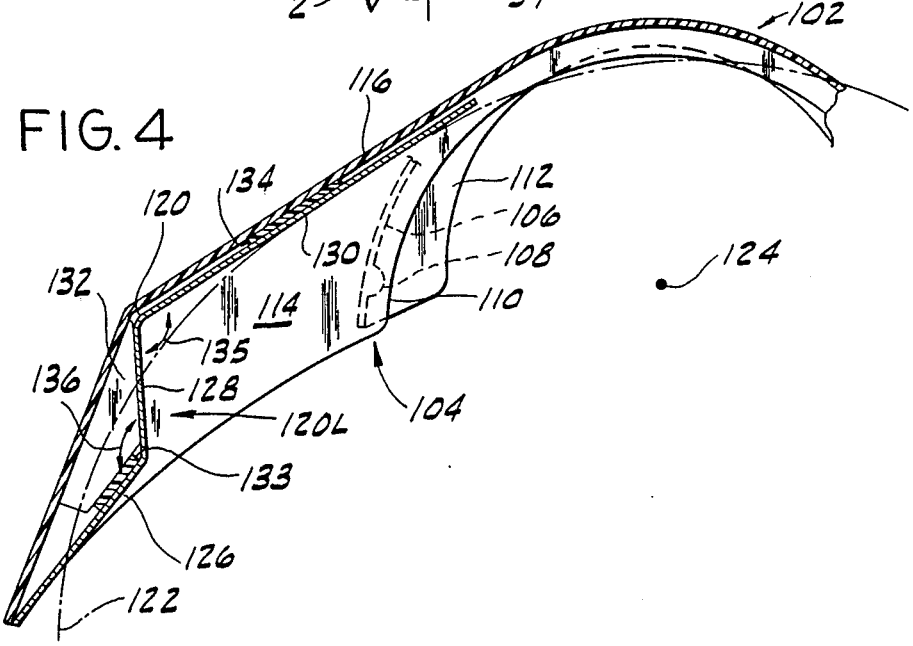

MULTICOLOR EMERGENCY VEHICLE LIGHT

FIELD OF THE INVENTION

The invention relates generally to lights for emergency vehicles and, more particularly, to the construction of an emergency vehicle light which emits a multicolored flash.

BACKGROUND OF THE INVENTION

Emergency lights are utilized on many different types of vehicles such as police cars, ambulances, wreckers etc. to give visual indications of their presence during emergencies. The dome of an emergency light is normally tinted to impart the desired color, typically red, blue or yellow, to the light emitted. If it is desired to emit light different colors simultaneously, several lamps are mounted on a light bar, such as disclosed in co-assigned U.S. Pat. No. 4,543,622, and lenses of the desired colors are placed on the various lamps of the light bar.

However, such light bars are expensive and are much bulkier than single lamp, emergency lights. Furthermore, such light bars, because of their size, must generally be mounted on the exterior of a vehicle.

SUMMARY OF THE INVENTION

It is an object of this invention to provide an emergency vehicle light which employs a single lamp and emits multiple flashes of different colors.

It is another object of this invention to provide a multiflash emergency vehicle light which is compact in size, inexpensive to manufacture and employs a snap-on reflector and a snap-on filter.

It is still another object of this invention to provide a multiflash emergency vehicle light which may be temporarily mounted on a vehicle or permanently mounted on a vehicle either within the passenger compartment of the vehicle or on the exterior of the vehicle.

It is yet another object of this invention to provide an emergency vehicle light which may be quickly and conveniently converted to emit various colored light or to emit multicolored light.

It is another object of this invention to provide an emergency vehicle light having a wire for supplying electrical power which is securely fastened by a strain relief to the light so that axial force on the wire does not disconnect the wire from the light.

The emergency vehicle light according to the invention comprises a base adapted to be mounted on a vehicle and a light source. Connecting means connects the light source to a power supply. Reflecting means reflects light emitted by the light source. Support means supports the reflecting means and the light source on the base such that the reflecting means is positioned to reflect light emitted by the light source as a beam of light. Rotating means rotates the reflecting means around the light source whereby said beam is adapted to sweep a generally planar area of illumination. A dome-shaped lens is adapted to be positioned on the base over the light source to form, in conjunction with the base, an enclosure for the light source. The lens has a front portion and an opposing rear portion. A generally curved or segmented reflector adapted to be positioned adjacent the rear portion of the lens reflects light emitted by the light source and/or reflected by the reflecting means in a plane corresponding or substantially parallel to the generally planar area. Means are provided for mounting the curved or segmented reflector on the rear portion of the lens. Strain relief means secures the wire against strain adjacent the location where the wire exits the enclosure. A filter generally having a contour of the front portion of the lens is provided. Means are provided for shielding the lens from heat rising from the light source.

Other objects and features will be in part apparent and in part pointed out hereinafter.

BRIEF DESCRIPTION OF THE DRAWINGS

FIG. 2 is a perspective, diagrammatic view of one preferred embodiment of the emergency vehicle light according to the invention including the filter and the reflector assembly positioned on the light;

FIG. 3 is a diagrammatic front plan view of one preferred embodiment of the emergency vehicle light according to the invention including the reflector assembly;

FIG. 4 is a partial cross-sectional view taken along lines 4—4 of FIG. 1 illustrating the reflector assembly;

Corresponding reference characters indicate corresponding parts throughout the several views of the drawings.

DETAILED DESCRIPTION OF THE PREFERRED EMBODIMENT

Figure 1:
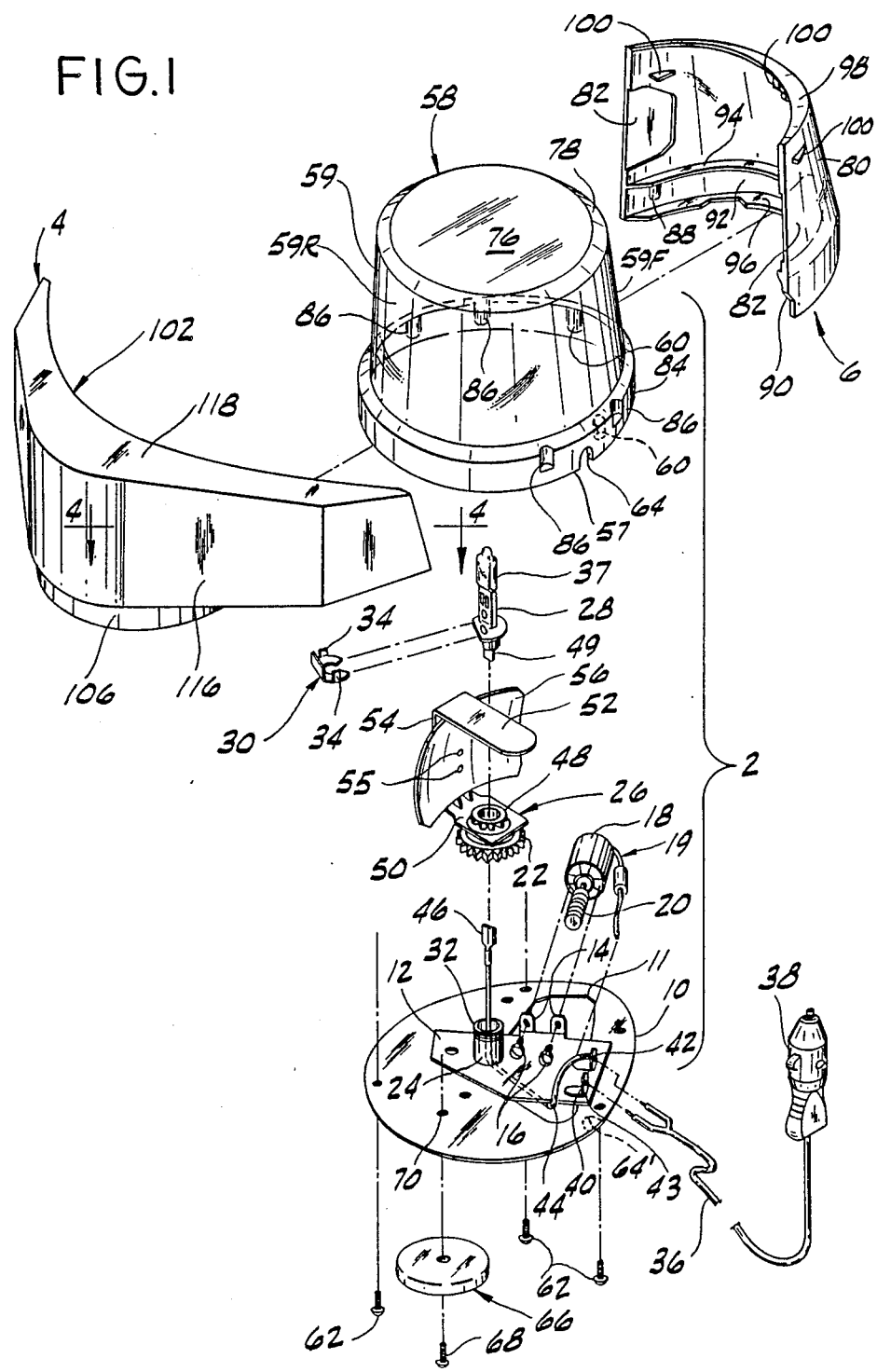
FIG. 1 is an exploded, perspective, diagrammatic view of one preferred embodiment of the emergency vehicle light according to the invention including the filter and reflector assembly.

Referring to FIGS. 1 and 2, the emergency vehicle light according to the invention is generally referred to by reference character 2, the reflector according to the invention for use in combination with light 2 is generally referred to by reference character 4, and the filter according to the invention for use with light 2 is generally referred to by reference character 6.

Light 2 includes base 10 which is a substantially rigid, substantially planar member such as an oblong shaped piece of sheet metal adapted to be substantially horizontally positioned. Base 10 is provided with an indentation forming depression 11. Over depression 11 and parallel to base 10 is positioned substantially rigid, planar support member 12 having laterally, upwardly extending, substantially perpendicular tabs 14. Each tab 14 has an aperture for receiving a fastener, such as screw 16, which engages the housing, such as by a threaded opening, of motor 18. The drive shaft of motor 18 is connected to a worm gear 20 which meshes with toothed gear 22 so that energizing of motor 18 results in axial rotation of worm gear 20 which, in turn, axially rotates toothed gear 22. The motor and gears constitute rotating means for rotating parabolic reflector 56 around a light source (lamp 37) whereby the beam reflected by the parabolic reflector 56 is adapted to sweep a generally planar area of illumination (as illustrated by reflecting plane 300 in FIG. 3).

Depression 11 also provides an area within which the lower portion of motor 18 may be positioned so that the worm gear 20 may be properly aligned with and properly engage toothed gear 22.

Planar support member 12 has an aperture therein which is coaxial with an axial opening in upwardly projecting sleeve 24. Toothed gear 22 has a centrally located opening therein through which sleeve 24 projects so that the sleeve functions as a shaft on which gear 22 rotates. Sleeve 24 also projects through an opening in reflector support 26 so that socket 28 may be positioned within the axial opening of the sleeve 24. Retaining clip 30 engages an annular groove 32 along the periphery of the top end of sleeve 24 and includes prongs 34 which hold socket 28 within the axial opening of sleeve 24.

A bulb such as a 55 watt H1 type halogen lamp 37, constituting a lamp means, is located within socket 28 and functions as a light source generally located on base 10 of emergency light 2 according to the invention. A length of dual conductor wire 36 is provided to interconnect socket 28 to a power supply. One end of the wire 36 may be terminated by and connected to cigar lighter plug 38 which may be plugged into the cigar (cigarette) lighter aperture of a vehicle in order to provide electrical power to the light 2. Alternatively, the two conductors at the plug end of wire 36 may be directly connected to a battery or other power supply. The other end of wire 36 has two conductors, one of which is connected to grounded terminal 40 and the other of which is connected to insulated terminal 42. Grounded terminal 40 is electrically connected to planar support member 12 and base 10, both of which are of electrically conductive material such as metal. Motor 18 and gears 20 and 22 constitute means for effecting relative movement between the beam of light (provided by the parabolic reflector 56) and the reflector 4 whereby the beam of light emitted by the lamp is adapted repetitively to traverse the reflector segments in sequence whereby an observer is adapted to observe at least three discrete flashes of light in a repetitive sequence with each flash corresponding to a reflection of the beam off a respective reflector segment. The means for effecting relative movement is operable to rotate the lamp about an axis generally perpendicular to the plane of the beam as reflected by the reflector 4.

Terminal 42 is insulated from the support member 12 and base 10, such as by insulated spacer/connector 43, and is connected to lead wire 44 which is positioned under the member 12 between the member 12 and base 10. In general, depression 11 in base 10 provides a clearance under member 12 within which lead wire 44 may be located. The other end of lead wire 44 is connected to connector 46 and projects through the aperture in member 12 and the coaxial opening in sleeve 24 for connection to socket 28. Preferably, an outer portion of socket 28 and sleeve 24 are electrically conductive (metallic) members so that the socket is electrically grounded. Connector 46 engages tab 49 which is insulated from the outer grounded portion of the socket 28 and is connected to one of the terminals of lamp 37 (which is integral with socket 28). The other terminal of lamp 37 is electrically connected to ground via the direct connection of it to the outer portion of socket 28. Lead wire 19 connects to terminal 42 to provide power to motor 18 (which includes an EMI suppressor). The housing of motor 18 is grounded via tabs 14 to complete the circuit.

Toothed gear 22 may be fixedly mounted to reflector support 26 by retainer 48 which engages a laterally (upwardly) projecting annular sleeve of toothed gear 22. Therefore, rotation of gear 22 about sleeve 24 results in rotation of support 26 about sleeve 24 around coaxially located lamp 37. Socket 28, held in place within sleeve 24 by retaining clip 30, retains the entire rotating assembly: reflector support 26, gear 22 and retainer 48 to prevent upward movement of this rotating assembly with respect to sleeve 24.

Reflector support 26 is a generally U-shaped member having horizontal legs 50 and 52 and vertical support 54 interconnecting the legs such that the legs 50 and 52 are substantially parallel to each other and are substantially perpendicular to vertical support 54. Support 54 supports parabolic reflector 56 which has a parabolic shape with respect to the horizontal plane as well as with respect to the vertical plane with the focal point substantially at the center of the lamp filament. Rivets 55 attach reflector 56 to support 54. Leg 50 and support 54 along with sleeve 24 and member 12 constitute means for supporting the reflecting means (parabolic reflector 56) and the light source (lamp 37) on base 10 such that the reflecting means is positioned to reflect light emitted by the light source as a beam of light. Accordingly, reflector 4 constitutes reflector means adjacent the base having at least three reflector segments arranged generally along a curve, each reflector segment being adapted to reflect the beam of light emitted by the lamp for observance by an observer remote from the vehicle.

Figure 8A:
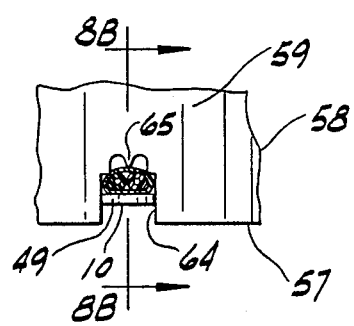
FIG. 8A is a partial, enlarged, assembled view of FIG. 1 illustrating the engagement of the connecting wire between the lens and the base.
Figure 8B:
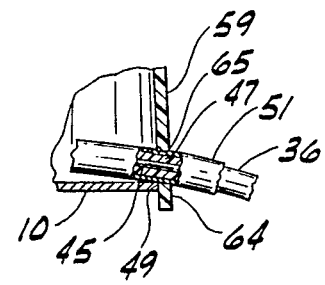
FIG. 8B is a partial cross-sectional view taken along lines 8B—8B of FIG. 8A.

A dome-shaped lens, generally designated 58, of impact-resistant clear polycarbonate or the like is positioned on base 10 to form an enclosure for the parts located upon the base including lamp 37. Leg 52 of reflector support 26 functions to deflect heat emitted by lamp 37 so that the heat rising from lamp 37 does not directly impinge upon lens 58. The lens is of one-piece molded construction and is generally frusto-conical in shape, having a side wall 59 with front and rear portions 59F,59R, a substantially flat opaque top 76 generally parallel to base 10 joined to the side wall by a tapered annular edge 78, and a circular rim 84 at the bottom of the lens. A plurality of screw bosses 60 are integrally formed with the rim for receiving screws 62 which affix the lens 58 to base 10. As illustrated in FIGS. 1, 8A and 8B, a notch 64 extends up from the bottom edge 57 of the lens, the design being such that when the lens 58 is positioned on base 10, notch 64 forms, in conjunction with the edge 57 of base 10, an aperture through which wire 36 passes. Alternatively, a notch 64' may be located in side edge of base 10 and extend inwardly from the side edge to form, in conjunction with the edge 57 of base 10, an aperture for receiving wire 36.

As shown in FIGS. 8A and 8B, the edge of notch 64 presses wire 36, including optional jacket 51 enclosing conductor 45 and insulation 47, which surrounds the conductor, against the edge 49 of base 10, which edge projects below the base. At least one tooth 65 extending into notch 64 engages wire 36 to assist in holding it in fixed position relative to lens 58 and base 10 when lens 58 is mounted on base 10 so that axial force on wire 36 is not transmitted to terminals 40 and 42 and does not result in damage to the electrical connection of wire 36 to the terminals. Thus, notch 64 and tooth 65 constitute strain relief means for securing wire 36 against strain adjacent the location where wire 36 exits the enclosure formed by base 10 and lens 58. Notch 64' in base 10 (shown in FIG. 1) may be used in place of notch 64. In either case, the notch is sized and configured so that the wire is clamped in fixed position when lens 58 is mounted on base 10.

Figure 7:
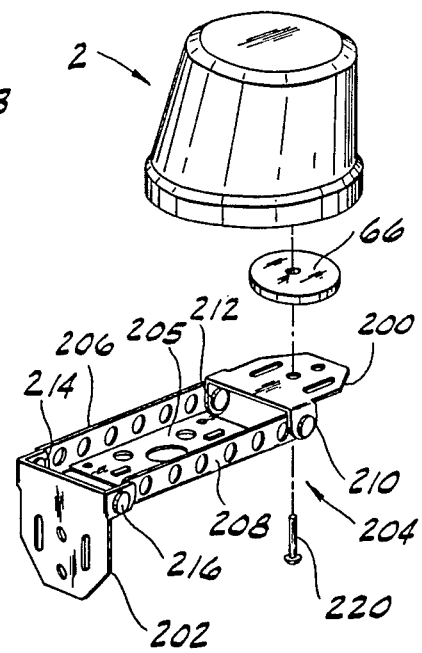
FIG. 7 is an exploded, perspective diagrammatic view of one preferred embodiment of the support bracket for use in combination with the emergency vehicle light according to the invention.

Disc-shaped magnet 66 is optionally, permanently attached to the underside of base 10 by a sheet metal screw 68 threaded in an aperture 70 in base 10. Magnet 66 magnetically engages a portion of the vehicle to which light 2 is to be mounted. Alternatively, a support bracket 204 such as illustrated in FIG. 7 may be used to support light 2 on the vehicle. The bracket is preferably made of a rigid ferromagnetic material and is of channel shape, having a generally horizontal web 205 and parallel side flanges 206, 208 bent upwardly therefrom. A pair of flaps 200,202 have tabs 210, 212, 214 and 216 perpendicular thereto which are connected to these flanges at opposite ends of the bracket for pivotal movement about generally horizontal axes extending in side-to-side direction with respect to the bracket. This bracket 204 permits the light 2 to be mounted on any inclined surface with base 10 of light 2 substantially horizontal. This may be accomplished by attaching the flap 200 to the underside of the base 10 by means of the magnet 66, or by a screw 220. Alternatively, an adhesive may be used to attach flap 200 to light 2. Flap 202 may be attached to a vertical mounting surface by bolts, adhesive, a magnet or other well known means.

Filter 6 is also preferably of molded plastic and generally has the shape of and is adapted to cover the front portion 59F of lens 58. In particular, filter 6 has a curved surface 80 which generally conforms to the front portion 59F of lens 58 when the filter 6 is mounted on the lens 58. Filter 6 is of a generally transparent synthetic resin such as plastic which allows only one color of light to pass therethrough. It is contemplated, for example, that filter 6 may be red, blue, amber, or green. Filter 6 is provided with sections adapted to be removed from filter 6 to decrease the area of lens 58 covered by filter 6. In particular, these sections may be panels 82 of reduced thickness adjacent opposite vertical side edges of filter 6, the panels being selectively removable (e.g., by cutting) in order to minimize the coverage of filter 6 over lens 58.

As best shown in FIG. 1, the filter has a curved channel formation 90 along its bottom edge comprising a generally vertical web 92 and inwardly projecting, generally horizontal, upper flanges 94 and lower flange 96 generally parallel to the upper flanges. The channel portion 90 has a shape generally corresponding to the shape of the bottom rim 84 of the lens, the arrangement being such that a portion of the lens bottom rim is receivable in the channel formation between flanges 94 and 96 to mount the filter on the lens at the front of the lens. Detents 88 integrally formed with the web 92 of the channel formation have a snap fit in recesses 86 in the bottom rim of the lens to removably fasten the filter to the lens.

Figure 5:
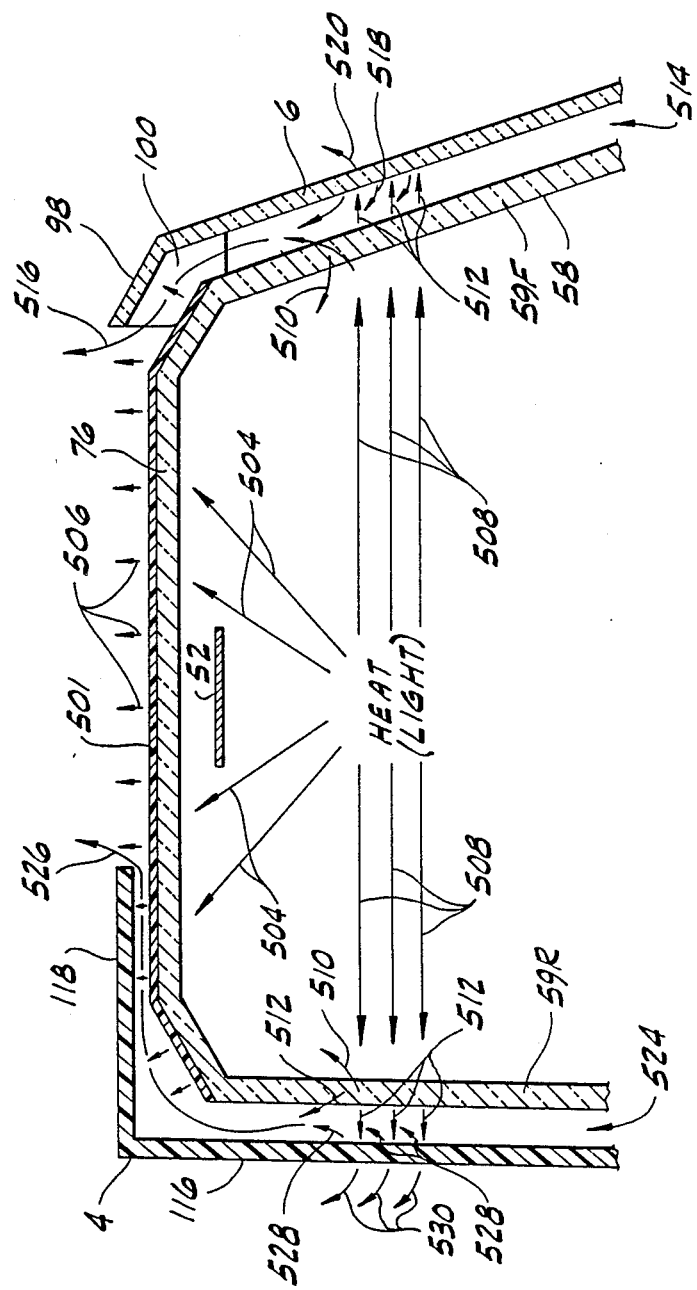
FIG. 5 is a partial cross-sectional view taken along lines 5—5 of FIG. 2 illustrating the spacers which support the filter away from the lens and the spacing between the reflector housing and the lens.
Figure 6A:
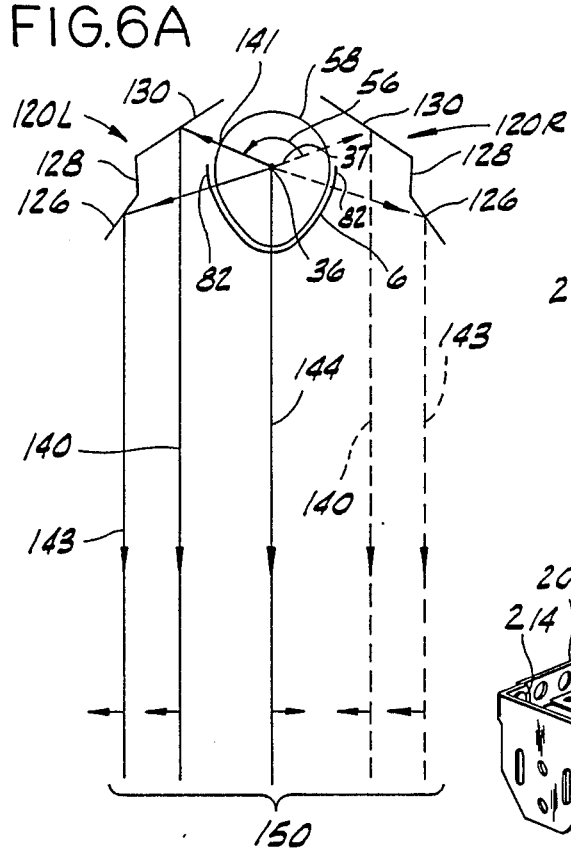
FIGS. 6A–6F are diagrammatic top plan views (not to scale) of the light paths of the emergency vehicle light according to the invention including the reflector assembly positioned on the light.

As shown in FIGS. 1 and 5, a plurality of spacers 100 project from and are integral with the inner surface of filter 6 to space the filter 6 from the front portion 59F of lens 58 when the filter is mounted on the lens. This permits air to pass through the space 514 between the filter 6 and lens 58 so that heat built up on the filter 6 (particularly when it is opaque) can be dissipated and is not directly transferred to lens 58.

The outer surfaces of the top 76 and tapered edge 78 of lens 58 are coated with an opaque paint 501 or the like to prevent light from passing through top 76 and being reflected by the windshield or otherwise entering the passenger compartment. Paint 501 absorbs heat, as indicated by arrows 504 in FIG. 5, radiated by the lamp 37 and dissipates this heat, as indicated by arrows 506, to the air surrounding lens 58. It is significant that the paint 501 (or any suitable opaque coating) be applied to the outer surfaces of the lens 58, because if it is applied to the inner surface of the lens, heat will not dissipate as readily to the surrounding air. This will cause heat to build up within lens 58. If the light is operated for an extended period of time, this build-up may deform lens 58. Therefore, applying paint 501 to the outer surface of lens 58 is preferred.

Heat is also radiated to the side walls 59F,59R of lens 58, as indicated by arrows 508. This heat is absorbed by the side wall and some portion of the heat is re-radiated inwardly to air enclosed by lens 58 as indicated by arrows 510. A larger portion of the heat is re-radiated outwardly as indicated by arrows 512. The air space 514 between lens 58 and filter 6 permits this outwardly radiated heat to dissipate to the air as indicated by arrow 516. In addition, some of this outwardly radiated heat is absorbed by filter 6 and re-radiated as indicated by arrows 518 and 520. Similarly, air space 524 between the housing of reflector assembly 4 and lens 58 permits this outwardly radiated heat to dissipate to the air as indicated by arrow 526. In addition, some of this outwardly radiated heat is absorbed by assembly 4 and re-radiated as indicated by arrows 528 and 530. Therefore, air spaces 514 and 524 minimize heat build-up within lens 58. It will be understood that spacers 100, detents 88 and channel 90 constitute means for mounting filter 6 in proper position on the front portion 59F of lens 58 to form air space 514.

As shown in FIG. 4, reflector 4 is mounted on the rear portion 59R of lens 58 and includes a generally curved reflector housing 102 made of synthetic resin or other rigid material. Housing 102 is of one-piece molded construction and includes a substantially horizontal bottom wall 114, a substantially vertical back wall 116, and a substantially horizontal top wall 118 (see FIG. 1). A channel formation 104 (similar to channel formation 90 on filter 6) on the underside of the bottom wall 114 of the housing 102 is provided for engaging a portion of the rim 84 of lens 58. Channel formation 104 has vertical web 106 formed with detents 108, an upper horizontal flange 110 constituted by an arcuate marginal edge portion of the bottom walls 114 of the housing, and a lower horizontal flange 112. This channel formation 104 received a portion of the bottom rim 84 of the lens, with the detents 108 snapping into recesses 86 on the rim to mount the reflector housing on the lens 58 in a position wherein the lens is located centrally of the housing with the housing extending laterally outwardly on opposite sides of the lens.

Housing 102 supports a pair of reflectors, one located at the left side of the housing (as viewed in FIG. 3) and being generally designated 120L and the other being located at the right side of the housing and being generally designated 120R. The reflectors are substantially identical and symmetrically arranged with respect to the central vertical plane V of the housing. Together these reflectors constitute a reflecting surface lying generally on curve 122 (e.g., ellipse, parabola, circle) preferably having one of its focal points 124 (see FIG. 4) generally coaxial with the filament of lamp 37. In particular, for a parabolic curve reflectors 120R and 120L should have coaxial focal points, and for circular and elliptical curves the reflectors should have a non-focused orientation with the lamp center located behind the focal points(s). The reflectors 120L and 120R are adapted to reflect light emitted by the light source (lamp 37) and/or reflected by the reflecting means (reflector 56) in a plane corresponding to or substantially parallel to the generally planar area 301 shown in FIG. 3.

Reflectors 120L,120R may be of any highly polished reflective material such as metal or plastic or silvered glass forming the flat sections. As illustrated in FIGS. 3 and 4, each reflector 120L,120R is shown as comprising three discrete flat reflective segments or sections 126, 128, and 130 arranged side by side with the central segment 128 of each set forming an obtuse angle 135 with adjacent segment 126 and forming an obtuse angle 135 with adjacent segment 130. The reflective sections are arranged in a generally curved configuration, such as curved path 122 located within a plane parallel to generally planar area 301 when reflector 4 is positioned adjacent rear portion 59R of lens 58. It is contemplated that each reflector 120L,120R may be formed as a single, continuous curved surface generally taking the shape of curve 122. Alternatively, a single reflective surface lying on ellipse 122 (or other curve such as a parabola or non-centered circle) may replace the two reflectors 120L, 120R shown in the drawings. The back wall 116 of the housing 102 includes horizontal ribs 132 (only one shown in FIG. 4) for supporting sections 126 and 128. A flat double-sided adhesive pad 133 may be located between each rib 132 and a respective section 126 to secure the two together and thereby support the section. Another pad, designated 134, may be positioned between section 130 and the back wall 116 of the housing to support section 130 in a substantially vertical orientation. As shown in FIG. 4, which illustrates only one half (the left half) of reflector assembly 4 (the right half being a mirror-image thereof), reflective section 128 is integral with segments 126 and 130 and is not separately supported. However, it is contemplated that segments 126, 128, and 130 need not be an integral, unitary structure and may be separately supported.

As illustrated in FIG. 3, the reflective sections 126, 128, 130 of reflector 4 are preferably mounted substantially vertical. As a result, light emitted by lamp 37 is primarily reflected in plane 300 which is substantially horizontal. Thus, light reflected by parabolic reflector 56 and/or reflected by reflectors 120L,120R forms a beam which is adapted to sweep a generally planar area of illumination 301 which includes plane 300.

The multicolored light-emitting function of the light 2 according to the invention will be described with reference to FIGS. 6A-6F (which are not to scale) from the point of view of an observer located within the area or zone 150 swept by the beams emitted from the light 2 of this invention. For the preferred embodiment illustrated in FIG. 6A, assume that lens 58 transmits amber light, that filter 6 transmits red light, that reflectors 120L, 120R, and reflector 56 reflect all light (i.e., the whole visible light spectrum) and that lamp 37 emits white light. White light emitted by lamp 37 as well as light reflected by parabolic reflector 56 and striking reflector sections 130 is directed along paths 140. Because light along paths 140 passes only through amber lens 58 at points 141, this light is generally amber as viewed by an observer in zone 150. White light emitted by the lamp and light reflected by reflector 56 striking reflector sections 126 is directed along path 143. Because light along paths 143 passes through panels 82 of filter 6, this light is filtered and only the color of filter 6 (i.e., red) is emitted. However, if panels 82 are removed from filter 6, light along path 143 would then be amber, i.e., the color of lens 58. Sections 128 serve as interruptions between segments 126 and 130 so that flashes from sections 126 and 130 are discrete and do not appear as continuously emanating from the light. An observer in zone 150 would also see light emitted directly by lamp 37 as well as light reflected by reflector 56 along path 144 as filtered (i.e., red) light.

The primary reflecting surfaces of assembly 4 including reflectors 120R,120L are reflector sections 126 and 130. Therefore, the reflector 4 of this invention can be said to provide five-flash operation when used in combination with light 2 because an observer in zone 150 will see five flashes: (1) a (red) flash from left reflector section 126 of reflector 120L; (2) a (amber) flash from left section 130 of reflector 120L; (3) a (amber) flash from right section 130 of reflector 120R; (4) a (red) flash from right section 126 of reflector 120R; and (5) a (red) flash from lamp 37 and reflector 56 along path 144.

By providing various colors to filter 6, lens 58 (and/or lamp 37 and/or reflector 56) and the reflector sections 126 and 130 of each of the reflectors 120L,120R, a plurality of color combinations for five-flash operation can be obtained. For example, lens 58 may be amber, filter 6 may be red, and all sections of reflector 120L and reflector 120R may reflect all colors of light to provide repetitive cyclical flashing of red, amber, amber, red and red. Amber and red are adjacent in the light spectrum so that an amber lens also passes red light. In another example, lens 58 may be clear, filter 6 may be amber, sections 126 may reflect red light only and sections 130 may reflect all colors of light to provide repetitive cyclical flashing of amber, red, white, white and red. Alternatively, filter 6 need not be used, lens 58 may be clear and each reflector section may reflect a different color light (e.g., red, amber, green and blue, respectively) to provide five flashes of different colors (i.e., red, amber, green, blue and white). In addition, filter 6 may be made of an opaque material to form an opaque cover interchangeable with and having the same construction as filter 6. The opaque cover may be substituted for filter 6 so that only light reflected by the reflector sections is emitted. In this configuration, light would be visible only to those observers located within the sectors of zone 150 which are illuminated by the reflector sections as noted below with regard to FIGS. 6B-6F. An opaque cover constitutes means for blocking the light beam emitted by the light source, reflected by parabolic reflector 56 and passing through the front portion 59F of lens 58. Alternatively, the outer surface of the front portion 59F of the lens 58 may be painted black, as is the top of the lens.

Other combinations will be readily apparent to those skilled in the art. In general, lens 58 transmits light within a first predetermined wavelength range (such as clear or amber), and/or filter 6 transmits light within a second predetermined wavelength range different from the first range (such as amber or red, respectively) and- /or reflector 4 transmits light within a third predetermined wavelength range different from the first and second ranges (such as red or clear, respectively). Alternatively, or in addition, the front portion 59F of the lens may transmit light within a predefined wavelength range and the rear portion 59R of the lens may transmit light within another, different predefined wavelength range.

As noted above, the reflectors 120L,120R may be replaced by a single reflecting, curved surface (e.g., ellipse, parabola, circle) in place of discrete reflector sections of the type shown in FIG. 4. If a single curved surface is used, light 2 and assembly 4 will provide a three-flash combination, one flash along path 144, a second flash as the beam of light reflected by reflector 56 traverses across reflector 120L to the left of light 2, and a third flash as the beam traverses reflector 120R to the right of light 2. These second and third flashes would each appear as a continuous flash of light for an extended period of time (as compared to the period of time of the flash along path 144 which more or less appears as a point beam due to the focusing of the light into a parallel beam by reflector 56). When the reflector assembly is parabolic or elliptical, these second and third flashes which occur as light beams reflected by reflector 56 sweep across the left and right sides (wings) of reflector assembly 4 and are each referred to as a "smear" of light. Accordingly, reflector 4 constitutes reflector means adjacent the base having at least two curved reflector segments, each reflector segment being adapted to reflect the beam of light emitted by the lamp for observance by an observer remote from the vehicle.

Figure 6B:
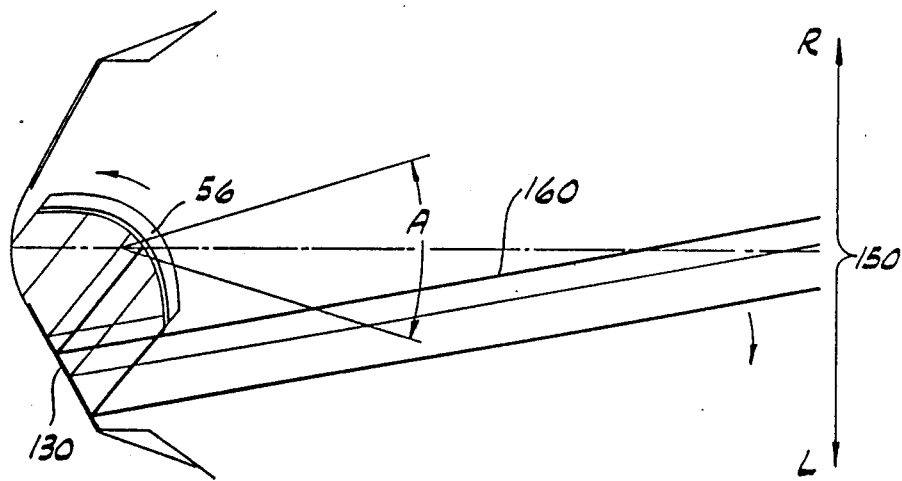
Figure 6C:
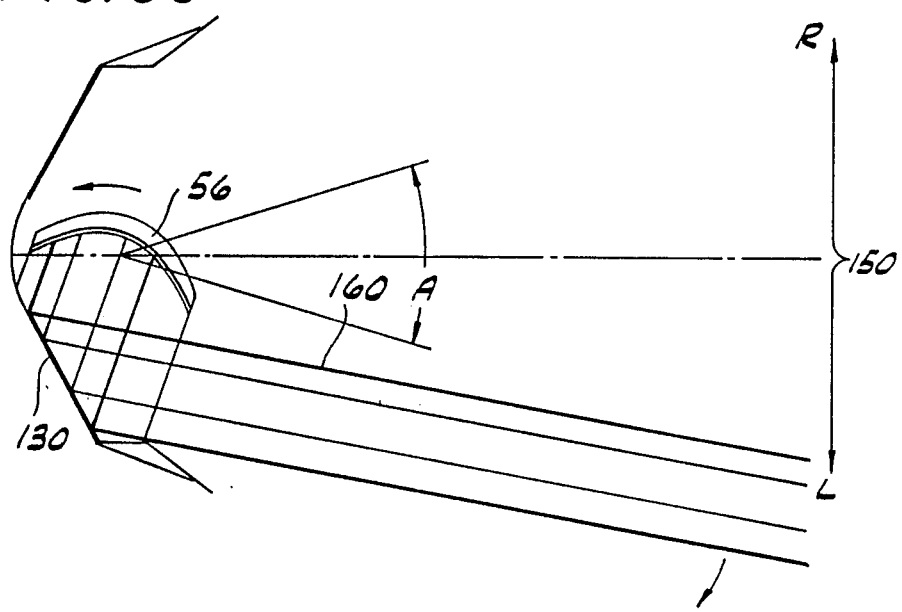
Figure 6D:
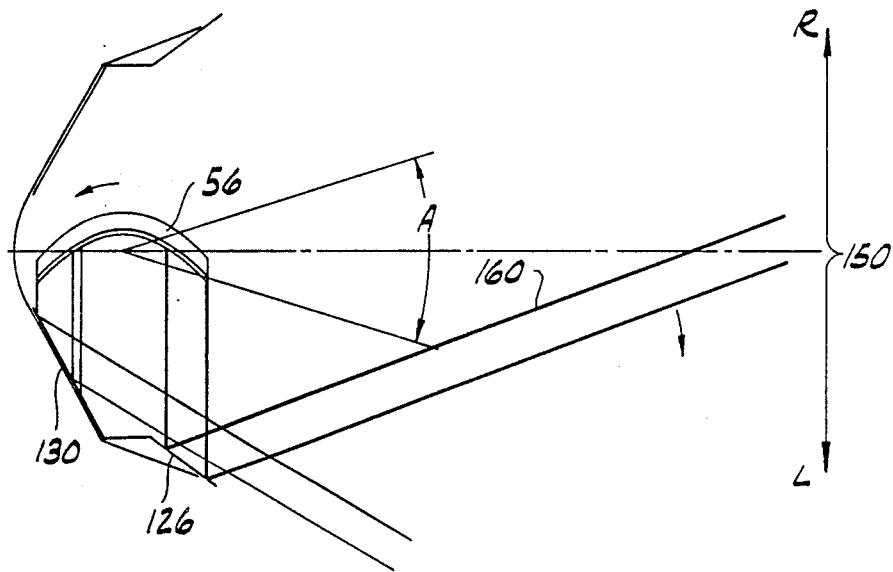
Figure 6E:
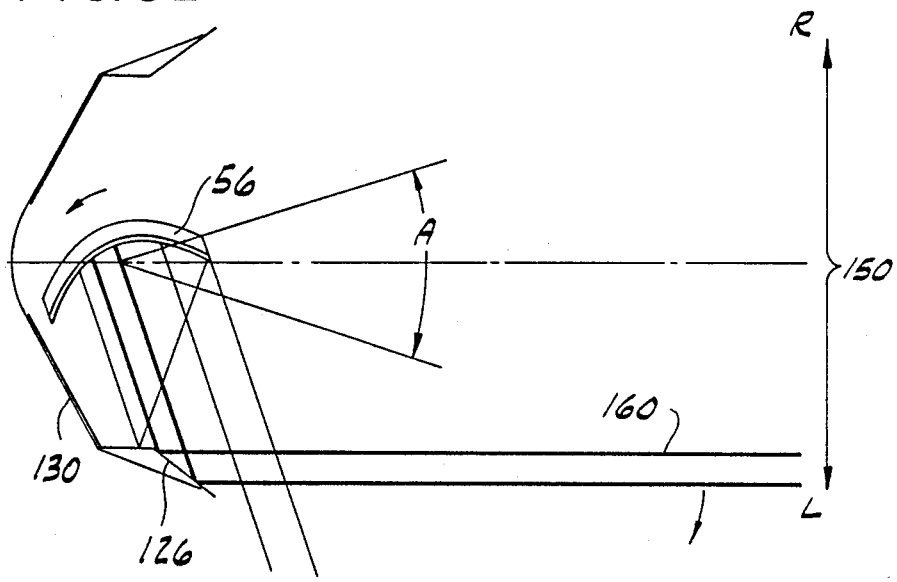
Figure 6F:
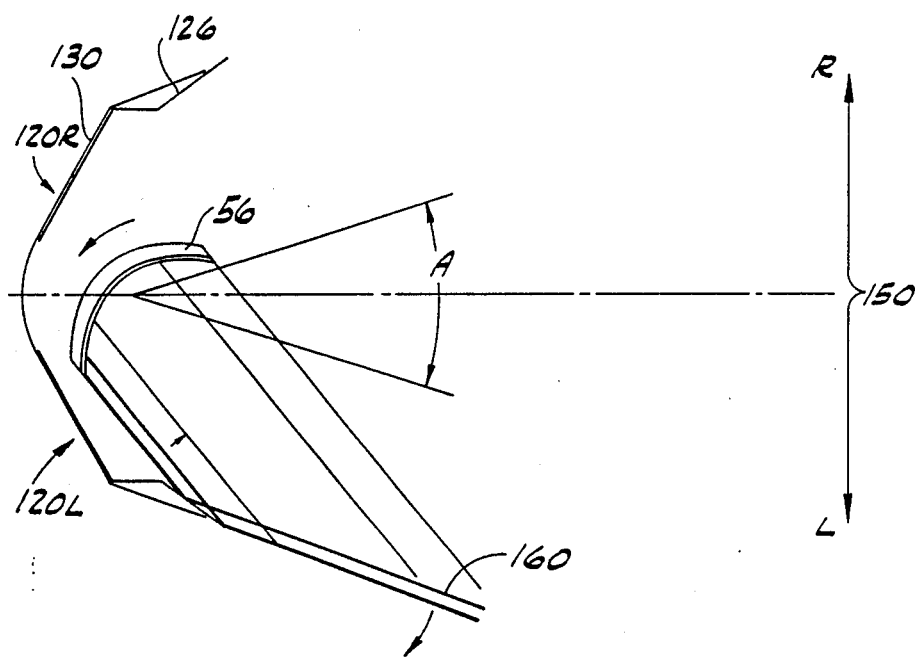

Referring to FIGS. 6B and 6C, as parabolic reflector 56 rotates counterclockwise, beam 160 strikes reflector section 130 and is reflected to sweep from right (R) to left (L) through a sector A and appears to an observer in zone 150 as a first flash. In general, sector A is an area within which the multiple flashes of light 2 may be observed and includes zone 150. Sector A may be as large as 120° to 180° depending upon the width of reflectors 120L,120R and slope of path 122 (FIG. 4) along which the reflector sections 126, 128, 130 are located. As illustrated in FIGS. 6D and 6E, as parabolic reflector 56 continues to rotate counterclockwise, beam 160 strikes reflector section 126 and is reflected. To an observer located in zone 150, beam 160 appears to sweep from right (R) to left (L) and appears as a second flash. As suggested by FIG. 6F, beam 160 as reflected by parabolic reflector 56 sweeps across an observer located in zone 150 to generate a third flash which appears to the observer to sweep from left (L) to right (R). Eventually, as parabolic reflector 56 continues to rotate counterclockwise, beam 160 will strike and be reflected by sections 130 and 126 of reflector 120R to create fourth and fifth flashes sweeping right (R) to left (L).

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An emergency vehicle light comprising:
a base adapted to be mounted on an emergency vehicle;
lamp means on the base for emitting a beam of light;
reflector means external to and projecting laterally beyond the base having at least three reflector segments arranged generally along a parabolic curve having a focal point coaxial with said lamp means, each reflector segment being adapted to reflect the beam of light emitted by said lamp means for observance by an observer remote from said vehicle; and
means for effecting relative movement between said beam and said three reflector segments whereby said beam of light emitted by said lamp means is adapted repetitively to traverse said reflector segments in sequence whereby said observer is adapted to observe at least three discrete flashes of light in a repetitive sequence after each traverse of said reflective segments by said beam with each flash corresponding to a reflection of said beam off a respective reflector segment.

2. The light of claim 1 wherein said reflector segments comprise a plurality of flat reflectors arranged generally side-by-side along said curve.

3. The light of claim 1 wherein said means for effecting relative movement is operable to move said lamp means relative to said reflector means.

4. The light of claim 3 wherein said means for effecting relative movement is operable to rotate said lamp means about an axis generally perpendicular to the plane of said beam as reflected by said reflector means.

5. The light of claim 1 wherein said reflector segments are adapterd to reflect the beam of light emitted from said lamp means as reflected light beams of one or more colors different from the color of the light beam emitted by said lamp means.

6. The light of claim 1 further comprising a lens on the base for enclosing said lamp means, said lens having a front portion and a rear portion, and filter means releasably mounted on said front portion of the lens for filtering the light beam emitted by said lamp means.

7. The light of claim 6 further comprising lens means on the base for enclosing the lamp means, said lens means having a front portion and an opposing rear portion and means, positioned on the front portion of the lens means, for blocking the light beam passing through the front portion, said means for blocking interchangeable with said filter means.

8. The light of claim 2 further comprising lens means on the base for enclosing the lamp means, said lens means having a front portion and an opposing rear portion and means, releasably mounted on the front portion of the lens means, for blocking the light beam passing through the front portion.

9. An emergency vehicle light as set forth in claim 8 wherein said means for blocking comprises an opaque cover.

10. An emergency vehicle light as set forth in claim 9 further comprising means for spacing the opaque cover away from said lens means to create an air gap therebetween for dissipating heat absorbed by said lens means and/or said opaque cover.

11. An emergency vehicle light as set forth in claim 10 further comprising means for mounting said opaque cover on the front portion of the lens means, and wherein said means for spacing comprising lateral members positioned between the inner surface of the opaque cover and the outer surface of the lens means to separate the opaque cover and the front portion of the lens means when the opaque cover covers the front portion of the lens means whereby overheating of the lens means caused by the opaque cover is minimized.

12. An emergency vehicle light comprising:
a base adapted to be mounted on a vehicle;
a light source on the base adapted to emit a beam of light;
means for rotating the light beam relative to the base about an axis;
lens means on the base enclosing the light source, said lens means being adapted to transmit light within a first wavelength range; and
reflector means positioned external to and releasably mounted on the lens means for reflecting light from the light source, the reflected light being within a second wavelength range different from said first wavelength range whereby, on rotation of the light beam, a person viewing the emergency vehicle light is adapted to see discrete flashes of light of different colors.

13. The light of claim 12 wherein said lens means has a front portion and an opposing rear portion, the reflector means is positioned adjacent the rear portion, and further comprising filter means for filtering the light beam releasably mounted on the front portion of the lens means.

14. The light of claim 13 wherein said filter means transmits light within a third wavelength range different from the first and second ranges.

15. The light of claim 12 further comprising means, releasably mounted on the front portion of the lens, for blocking the light beam passing through the front portion.

16. An emergency vehicle light comprising:
a base adapted to be mounted on an emergency vehicle;
lamp means on the base for emitting a beam of light;
lens means on the base for enclosing said lamp means;
reflector means, adjacent to and projecting laterally beyond said lens means, having at least one curved reflector segment being adapted to reflect the beam of light emitted by said lamp means for observance by an observer remote from said vehicle; and
means for effecting relative movement between said beam and said reflector means whereby said beam of light emitted by said lamp means is adapted repetitively to sequentially traverse said reflector segments whereby said observer is adapted to observe discrete flashes of light in a repetitive sequence with each flash corresponding to a reflection of said beam off the reflector means.

17. The light of claim 16 wherein said means for effecting relative movement is operable to move said lamp means relative to said reflector means.

18. The light of claim 17 wherein said means for effecting relative movement is operable to rotate said lamp means about an axis generally perpendicular to the plane of said beam as reflected by said reflector means.

19. The light of claim 16 wherein said reflector segments are adapted to reflect the beam of light emitted from said lamp means as reflected light beams of one or more colors different from the color of the light beam emitted by said lamp means.

20. The light of claim 16 wherein said lens means has a front portion and a rear portion, and further comprising filter means releasably mounted on said front portion of the lens means for filtering the light beam emitted by said lamp means.

21. The light of claim 20 further comprising means for releasably mounting the reflector means to the lens means.

22. The light of claim 21 wherein said means for releasably mounting the reflector means to the lens means comprises a channel on the reflector means adapted to releasably engage the lens means.

23. The light of claim 22 wherein said channel comprises a web having detents thereon and said lens means includes recesses for receiving the detents.

24. The light of claim 20 further comprising a filter generally having a contour of the front portion of the lens means and means releasably for mounting the filter on the front portion of the lens means.

25. An emergency vehicle light comprising:
a base adapted to be mounted on a vehicle;
a light source on the base adapted to emit a beam of light;
means for rotating the light beam relative to the base about an axis;
connecting means including a wire for connecting the light source to a power supply located outside said enclosure;
a dome-shaped lens adapted to be positioned on the base over the light source to form, in conjunction with the base, an enclosure for the light source, said lens having a top wall and a side wall with a bottom edge projecting below the base; and
strain relief means for securing said wire against strain adjacent the location where the wire exits said enclosure, said strain relief means comprising a notch extending upwardly from said bottom edge for receiving said wire therethrough, said notch being so sized and configured that the lens is adapted to press the wire against the base when the lens is mounted on the base.

26. The light of claim 25 wherein said strain relief means further comprises at least one tooth extending into the notch for engaging the wire and holding it in fixed position relative to the lens and base when the lens is mounted on the base.

27. An emergency vehicle light comprising:
a base adapted to be mounted on a vehicle;
a light source on the base adapted to emit a beam of light;
lens means on the base for enclosing the light source, said lens means having a front portion and a rear portion;
filter means external to and releasably mounted on the front portion of the lens means for filtering the light beam as it passes through the front portion of the lens means.

28. The light of claim 27 wherein said lens means comprises a dome-shaped lens adapted to transmit light within a first wavelength range and said filter means transmits light within a second wavelength range different from the first range.

29. The light of claim 27 further comprising means for releasably mounting said filter means on the front portion of the lens means, said means for releasably mounting comprising lateral members positioned between the inner surface of the filter means and the outer surface of said lens means to separate the filter means and the front portion of the lens means when the filter means covers the front portion of the lens means whereby overheating of the lens means caused by the filter means is minimized.

30. The light of claim 29 wherein the members comprise projections on the inner surface of the filter means.

31. The light of claim 27 wherein said filter means include a channel adapted to releasably engage the lens means.

32. The light of claim 31 wherein said channel comprises a web having detents thereon and said lens means includes recesses for receiving the detents.

33. The light of claim 27 wherein the filter means includes a section adapted to be removed from the filter means to decrease the area of the lens means covered by the filter means.

34. The light of claim 33 wherein said section comprises a panel of reduced thickness adjacent an edge of the filter.

35. The light of claim 27 further comprising means for shielding the lens from heat rising from the light source.

36. The light of claim 35 wherein said means for shielding comprises a substantially flat, heat reflective member spaced away from and located between the light source and the lens and supported by the supporting means.

37. The light of claim 27 further comprising a support adapted to support the base on the vehicle, the support having first and second flaps and a web, each flap pivotally connected to an end of the web, the first flap adapted to engage the base and the second flap adapted to engage the vehicle.

38. The light of claim 37 wherein said web has parallel side flanges perpendicular to the web and said flaps have tabs perpendicular to the flaps and pivotally engaging the side flanges.

39. The light of claim 27 further comprising a reflector adapted to be positioned adjacent the rear portion of the lens means to reflect the light beam and including means for releasably mounting the reflector on the rear portion of the lens means.

40. The light of claim 39 wherein said means for mounting includes means for spacing the reflecting means away from said lens means to create an air gap therebetween for dissipating heat absorbed by said lens means and/or said reflector.

41. The light of claim 27 wherein said filter means comprises means releasably mounted on the front portion of the lens means, for blocking the light beam.

42. The light of claim 41 wherein said means for blocking comprises an opaque cover.

43. The light of claim 42 further comprising means for spacing the opaque cover away from said lens means to create an air gap therebetween for dissipating heat absorbed by said lens means and/or said opaque cover.

44. The light of claim 43 further comprising means for mounting said opaque cover on the front portion of the lens means, said means for mounting comprising spacers positioned between the inner surface of the opaque cover and the outer surface of the lens means to separate the opaque cover and the front portion of the lens means when the opaque cover covers the front portion of the lens means whereby overheating of the lens means caused by the opaque cover is minimized.

45. The light of claim 41 further comprising means for releasably mounting the blocking means to the lens means.

46. The light of claim 45 wherein said means for releasably mounting comprises a channel on the blocking means adapted to releasably engage the lens means.

47. The light of claim 46 wherein said channel comprises a web having detents thereon and said lens includes recesses for receiving the detents.

48. An emergency vehicle light comprising:
a base adapted to be mounted on a vehicle;
a light source on the base adapted to emit a beam of light;
lens means on the base enclosing the light source and having a top for absorbing heat and light within a first wavelength range and for readily dissipating absorbed heat to air surrounding the top of said lens means.

49. The light of claim 48 wherein said top of said lens means comprises a layer over an outer surface of said lens means.

50. The light of claim 49 wherein said layer comprises a coating on the outer surface of said lens means thereby preventing excessive heat build-up within the lens means.

51. The light of claim 50 wherein said coating comprises an opaque material adhered to the outer surface of said lens means.

52. An emergency vehicle light comprising:
a base adapted to be mounted on an emergency vehicle;
lamp means on the base for emitting a beam of light;
lens means on the base enclosing said lamp means;
reflector means having at least one reflector segment being adapted to reflect the beam of light emitted by said lamp means for observance by an observer remote from said vehicle;
means for releasably mounting said reflector means to said lens means; and
means for effecting relative movement between said beam and said reflector means whereby said beam of light emitted by said lamp means is adapted repetitively to traverse said reflector segments in sequence whereby said observer is adapted to observe discrete flashes of light in a repetitive sequence with each flash corresponding to a reflection of said beam off a respective reflector segment.

* * * * *